(12) United States Patent  
Baughman et al.

(10) Patent No.: US 7,309,060 B2  
(45) Date of Patent: Dec. 18, 2007

(54) WIRE PULLING DEVICE

(75) Inventors: James E. Baughman, Shelbyville, IN (US); Daniel S. O'Toole, Carmel, IN (US)

(73) Assignee: Speedypull, LLC, Indianapolis, IN (US)

( * ) Notice: Subject to any disclaimer, the term of this patent is extended or adjusted under 35 U.S.C. 154(b) by 0 days.

(21) Appl. No.: 11/593,370

(22) Filed: Nov. 6, 2006

(65) Prior Publication Data

US 2007/0114503 A1    May 24, 2007

Related U.S. Application Data

(60) Provisional application No. 60/733,854, filed on Nov. 7, 2005.

(51) Int. Cl.  
*B66D 1/00*     (2006.01)

(52) U.S. Cl. .................. 254/332; 254/134.3 R (58) Field of Classification Search ........... 254/329, 254/332, 342, 134.3 FT, 134.3 R  
See application file for complete search history.

(56) References Cited

U.S. PATENT DOCUMENTS

| | | | |
|---|---|---|---|
| 2,661,187 A | 12/1953 | Dailey | |
| 2,948,510 A | 8/1960 | Kieser | |
| 3,066,916 A | 12/1962 | Shaw | |
| 3,072,382 A | 1/1963 | Jones | |
| 3,072,383 A | 1/1963 | Vanderhagen | |
| 3,140,856 A | 7/1964 | Carpenter | |
| 3,968,952 A | 7/1976 | Newell | |
| 4,497,470 A | 2/1985 | Carter et al. | |
| 5,464,193 A | 11/1995 | Wrate | |
| 5,603,489 A * | 2/1997 | Regal | 254/378 |
| 5,607,143 A * | 3/1997 | Regal | 254/342 |
| 5,984,273 A | 11/1999 | Ray | |
| 6,286,815 B1 | 9/2001 | Ray | |
| 6,533,248 B1 | 3/2003 | Schafer | |
| 6,659,429 B2 * | 12/2003 | Shoji | 254/342 |
| 6,682,050 B1 * | 1/2004 | Ray | 254/134.3 R |
| 2002/0043657 A1 * | 4/2002 | Ray | 254/134.3 FT |
| 2004/0108496 A1 * | 6/2004 | Forsberg et al. | 254/134.3 FT |

* cited by examiner

*Primary Examiner*—Emmanuel M Marcelo  
(74) *Attorney, Agent, or Firm*—Bruce J. Bowman (57) ABSTRACT

The present invention is a portable wire pulling device that receives and utilizes the rotational power and control features and functions of a cordless, battery-operated electric hand drill to selectively drive a rotatable reel of the portable wire pulling device with sufficient torque and speed to efficiently and quickly pull a wire thereby. The wire pulling device has a frame configured to rotatably carry and selectively position a take-up reel, and a drive interface coupled to the reel and having an input drive shaft configured to receive the hand drill for applying rotational power to the drive mechanism to rotate the reel. No on-site power is needed. The frame extends from a folded position into an upright position and into an angled position in order to pull wire for different applications.

20 Claims, 8 Drawing Sheets

WIRE PULLING DEVICE

RELATED APPLICATION

This patent application claims the benefit of and/or priority to U.S. Provisional Patent Application No. 60/733,854 filed Nov. 7, 2005, entitled "Wire Pulling Device" the entire contents of which is specifically incorporated herein by reference.

BACKGROUND OF THE INVENTION

1. Field of the Invention

The present invention relates to portable wire, cable and line pulling devices.

2. Background Information

Larger and larger commercial buildings, warehouses, and other super sized structures are now being constructed that require long runs of electrical wires, cables, lines and/or the like (collectively, wires) during construction. Some wire runs can exceed 1000 feet in length and it becomes very difficult and time consuming to pull wires through such long runs. Traditionally, a rope is threaded through the space where the wire is to be run with one end of the rope fastened onto a specific wire or wire bundle. It is the electrician's job to then pull the rope/wire combination by hand through and over the wire run(s) specified by the building designer. Two or more workers are usually required for this process. As such, this process is time consuming and expensive in man hours. Safety may also become an issue because workers are often required to perform this difficult operation while working high on scaffold or on a lift.

In view of the above, a plethora of wire pulling devices has been invented. For instance, in U.S. Pat. No. 2,661,187 a portable, knock-down conduit pulling winch is disclosed having a reel spool that holds a steel cable or rope. The winch is driven by a portable electrically driven power vise that is detachably mounted to frames of the winch. The winch further includes a hand operated brake mechanism in order to control the quick stopping of the reel in operation. In U.S. Pat. No. 2,948,510 a portable cable puller and power unit is provided having a wheel supported base defining a rectangular frame. A reversible electric motor is supported by the frame and is coupled by gearing to a cable-winding drum that holds a cable. A brake drum is fixed to the shaft that rotates the cable-winding drum. Moreover, in U.S. Pat. No. 3,066,916 a wire or cable puller includes an adaptor, a rotatable drum, an electric motor for rotating the drum and one of a group of tubular pulling sleeves.

Additionally U.S. Pat. No. 3,072,382 discloses an electrical conduit wire puller having an essentially triangular winch support frame that holds a winch mechanism having a rotatable drum with a length of flexible line. The winch is preferably of the type having a rotary power input shaft that may be gripped by the chuck of a corded electrical hand drill. In U.S. Pat. No. 3,072,383 a cable pulling machine is shown having an elongated hollow rectangular frame supporting an electric motor that is coupled to gearing that is connected to a rotatable drum. The frame includes wheels for moving the cable pulling device in the fashion of a wheel barrow. Furthermore, in U.S. Pat. No. 3,140,856 a cable puller is described having a substantially rectangular horizontally disposed base having a reel, an electric motor mounted on the base and gearing coupling the motor to the reel. The gearing allows free rotation of the reel for unwinding of the cable and allows for geared winding of the cable back onto the reel. In U.S. Pat. No. 3,968,952 an assembly for pulling a line is shown that includes a frame, a power unit mounted on the frame and means for guiding a line from the power unit along the frame. The frame has various sections that allow the frame to be adjustable into a plurality of working positions.

Moreover, in U.S. Pat. No. 4,497,470 a powered, cart-mounted device for pulling electrical cable through conduit is shown that includes a rigid frame with wheels mounted thereon for being moved in a wheelbarrow-like fashion. The frame carries a motor for driving a torque converter and speed reducer that drives (rotates) a shaft. A reel of cable is attached to the shaft wherein a guide and support mechanism directs the cable to the reel and supports the entire device in a fixed position relative to the conduit through which the cable is being pulled. U.S. Pat. No. 5,464,193 teaches a multi-functional wire and cable pulling apparatus. The wire and cable pulling apparatus includes a housing, a frame and an AC/DC motor that drives a capstan that holds a wire feed pulling line. Also, U.S. Pat. No. 5,984,273 teaches a wire puller for pulling line through a conduit by employing motor force of a standard right angle corded power drill. The wire puller includes a stand and a frame onto which is mounted a drive shaft that carries a line spool. Lastly, U.S. Pat. No. 6,533,248 teaches a cable rack mounted cable puller and installation system for removably attaching to a cable rack and efficiently removing/installing cable upon the cable rack.

However, all of these prior art wire pulling devices suffer from various deficiencies. For instance, these prior art wire pulling devices are not too portable given their size and bulk. Moreover, since these prior art wire pulling devices require use of alternating current machinery for motive power they are restricted for use in places where there is a source of alternating current for operation. Furthermore, these prior art wire pulling devices do not provide flexibility in positioning for wire pulling, wire pulling capabilities or other constraints.

It is thus apparent from the above that here there is a need for a wire pulling device that overcomes the deficiencies of the prior art and/or that provides a totally novel approach to a wire pulling device.

It is moreover apparent from the above that there is a need for a light-weight, portable, fast and easy to operate device that can pull wire over large distances in order to greatly reduce the man hours and related costs usually required to properly perform this operation.

It is furthermore apparent from the above that there is a need for a light-weight, portable, fast and easy to operate device that can pull wire over large distances using a minimum of input power.

SUMMARY OF THE INVENTION

The present invention is a portable wire pulling device that utilizes the rotational power and control functions of a cordless, battery-operated electric hand drill to selectively drive a rotatable reel of the portable wire pulling device with sufficient torque and speed to efficiently and quickly pull a wire thereby.

The portable wire pulling device includes a drive interface for transferring the rotational power and control input from the cordless, battery-operated hand drill to the reel. Control input includes starting, stopping, rotational direction, rotational speed and clutching. The drive interface may include gearing between an input drive shaft of the drive interface and a drive shaft of the reel.

The portable wire pulling device includes a frame assembly that is adapted to allow variations in positioning of the reel. The frame assembly includes a base frame and a top frame that is pivotally attached to the base frame. Adjustable legs utilized between the base frame and the top frame fixes the various positions of the top frame and thus positions of the reel. Exemplary positions include an upright position and an angled position. When the adjustable legs are in a collapsed state, a stowed position may be achieved.

The portable wire pulling device may include a line guide that is pivotally attached to the top frame adjacent the reel. The line guide receives and guides a line being wound on the reel.

In one form, the present invention is a wire pulling device having a reel that carries a line, a frame to carry the reel, and a drive mechanism coupled to the reel and configured to utilize the rotational power and control features of a full featured, rechargeable, battery-operated portable hand drill or a built-in, battery-operated electric motor to provide power to rotate and control the reel. Reel rotation direction, reel rotation speed, starting, stopping and clutching are control features provided by the cordless hand drill. The drive mechanism includes a configured input drive shaft to receive the cordless hand drill. As such, no on-site power is needed. The frame is configured to extend from a folded position into an upright position and into one or more angled positions in order to pull wire for different applications.

In another form, the present wire pulling device has a reel spool that carries a line (e.g. a rope) of sufficient length to reach across a distance, a folding frame to carry the reel spool, and a drive mechanism coupled to the reel spool and configured to utilize the power and control features of a clutching, rechargeable, battery-operated portable (cordless) hand drill or a built-in battery-operated electric motor to provide power to control and rotate the reel spool.

The wire pulling device may have one or more suction cups with air release valves or other temporary mounting devices which may be incorporated into or onto the folding frame. These devices aim to provide security during use of the wire pulling device. The wire pulling device may also incorporate other attachment devices.

The folding frame of the present wire pulling device may be used to brace the top of the wire pulling device against any convenient overhead building member to provide stability during the pulling of the wire. A rope guide is also preferably incorporated into the wire pulling device to allow the rope to be wound uniformly onto the reel spool. Its light-weight and portability allow the present wire pulling device to be safely placed and used while working on a high lift or scaffold.

The present invention provides a light-weight, portable, efficient, fast and easy to operate device that can pull wire over large distances in a fraction of the time required for conventional wire pulling. This greatly reduces the man hours and related costs usually required to properly perform this operation.

The present invention may be used in various industries in addition to the electrical construction industry. For instance, the present wire pulling device is useful for virtually any installation operation that requires pulling wires and/or cable including but not limited to security systems, satellite and cable television systems, home entertainment systems, computer systems and/or the like.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Like reference numerals indicate the same or similar parts throughout the several figures.

DESCRIPTION OF THE PREFERRED EMBODIMENT

Figure 1:
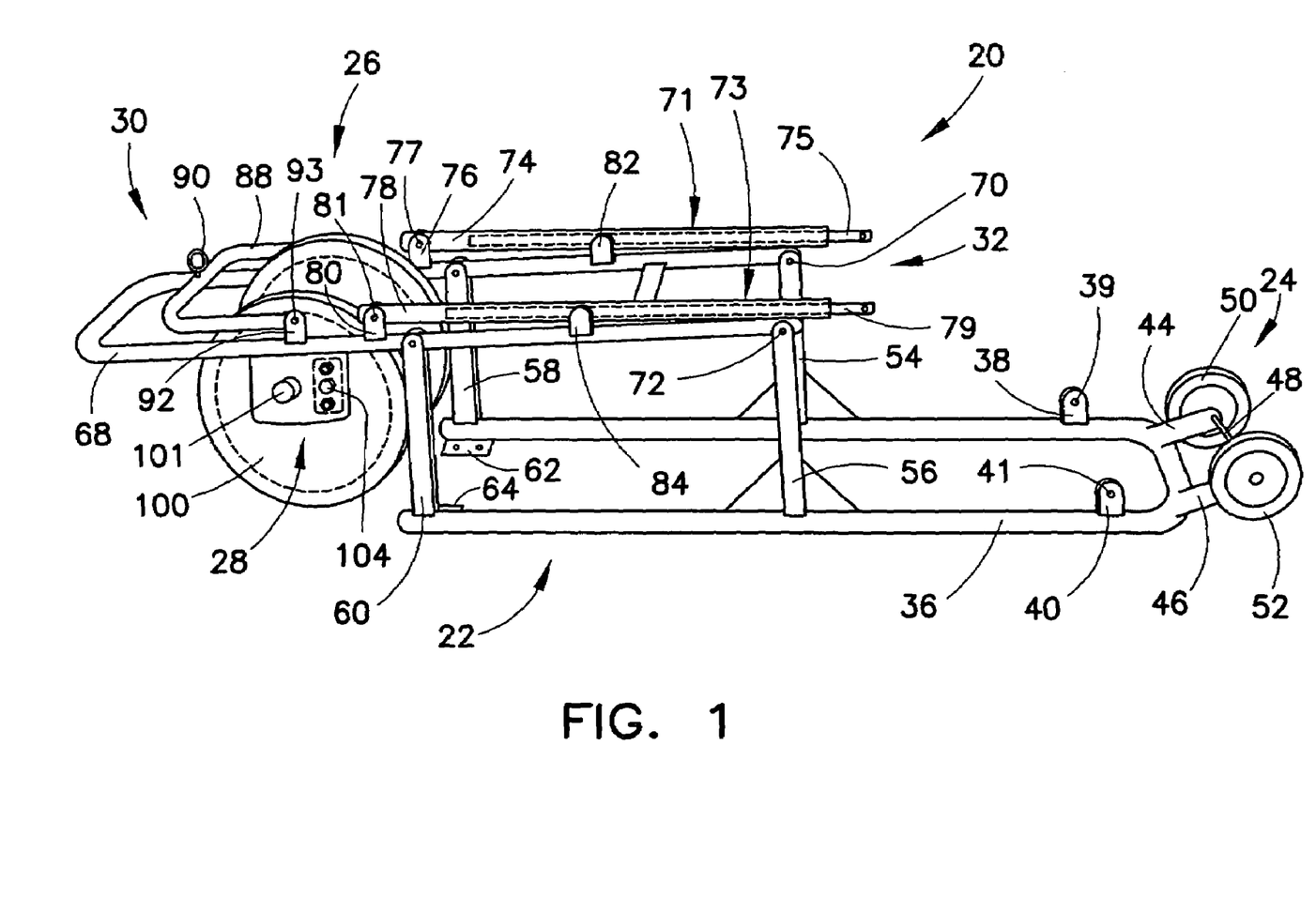
FIG. 1 is a side perspective view of an exemplary portable wire pulling device fashioned in accordance with the present principles, the portable wire pulling device in a folded position.
Figure 2:
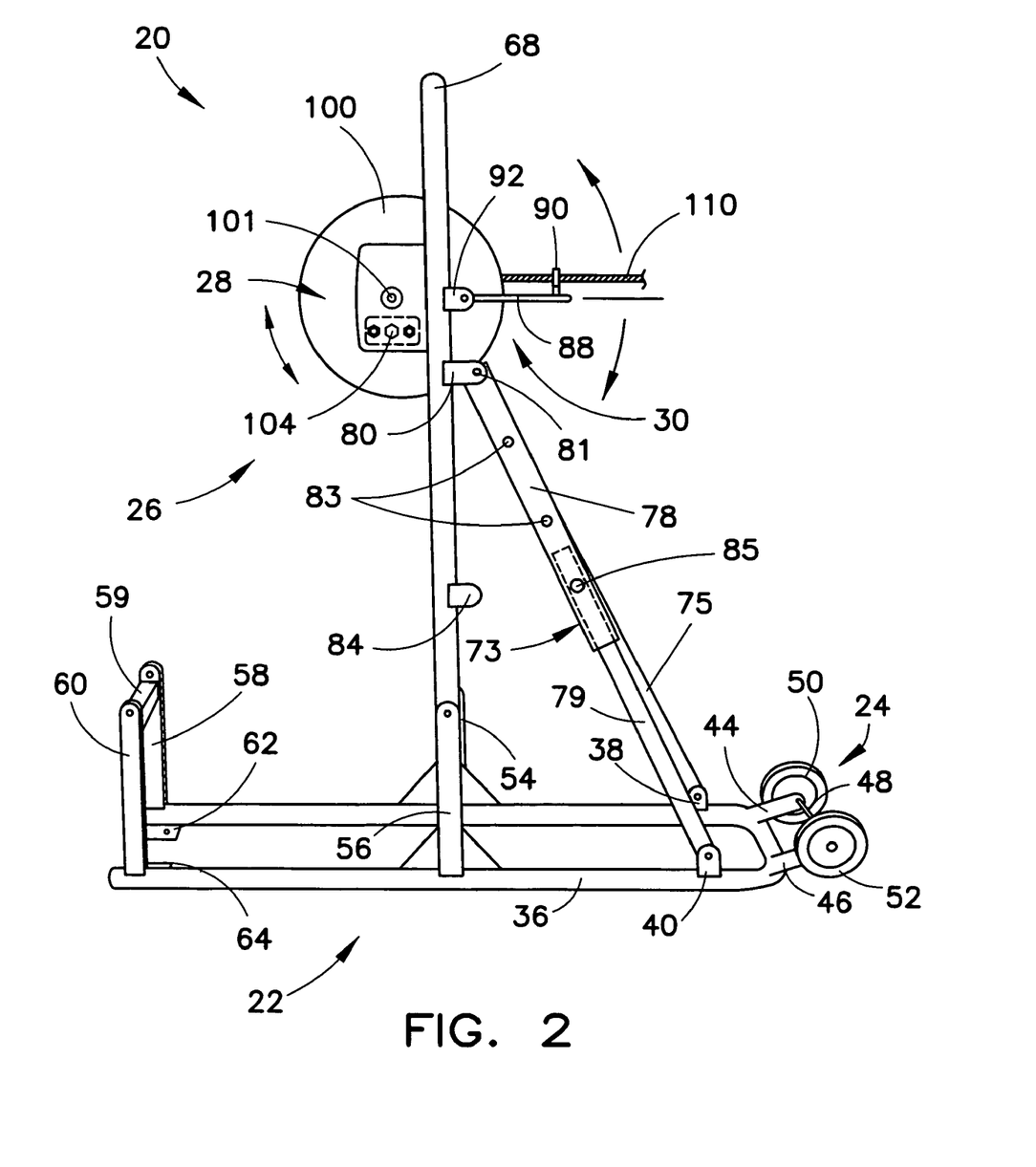
FIG. 2 is a side perspective view of the portable wire pulling device of FIG. 1 in a fully upright position, the wire pulling device shown having a line from the reel extending through a pivoting line guide of the present wire pulling device.
Figure 3:
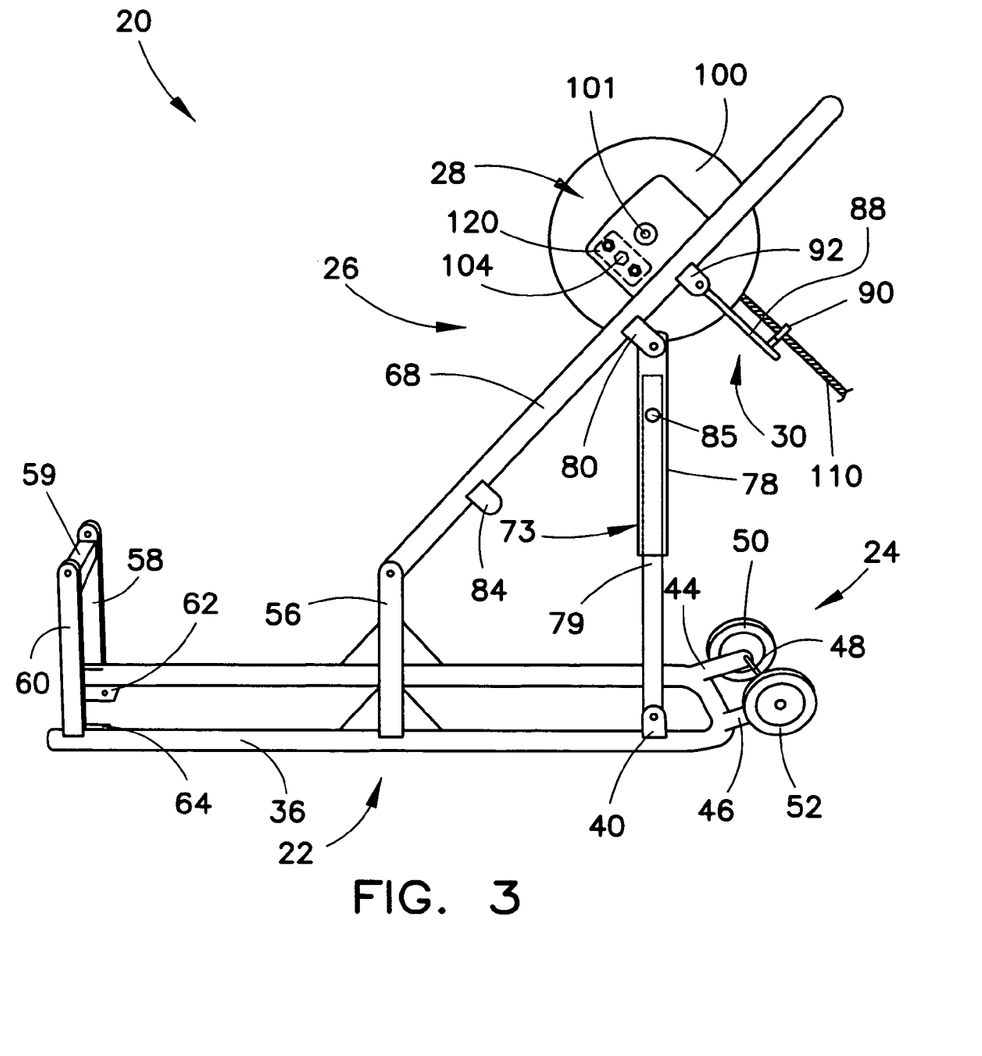
FIG. 3 is a side perspective view of the portable wire pulling device of FIG. 1 in an angled position, the wire pulling device shown having a line from the reel extending through the pivoting line guide.
Figure 4:
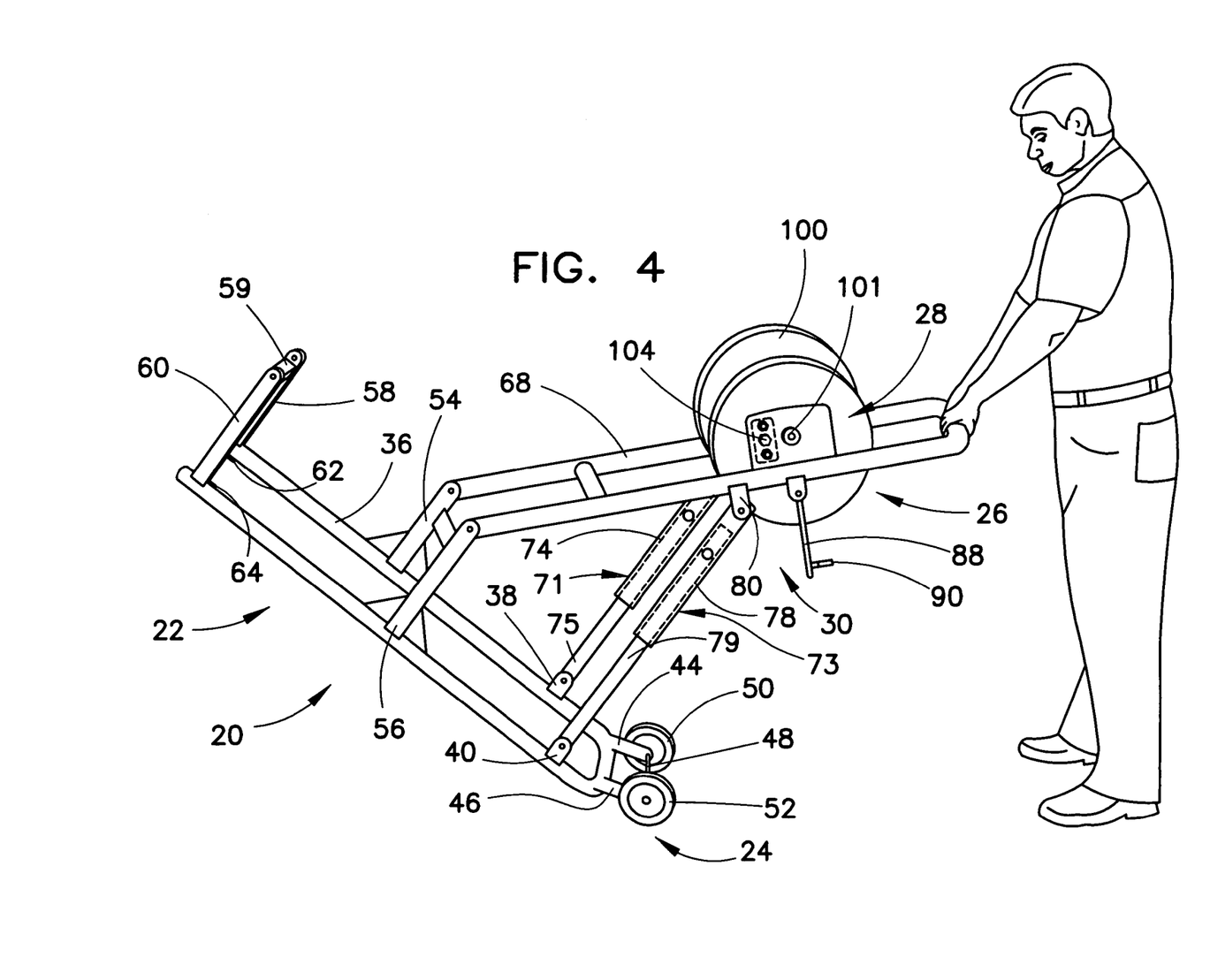
FIG. 4 is a side perspective view of the portable wire pulling device of FIG. 1 being moved by a user when in an angled position such as shown in FIG. 3.
Figure 5:
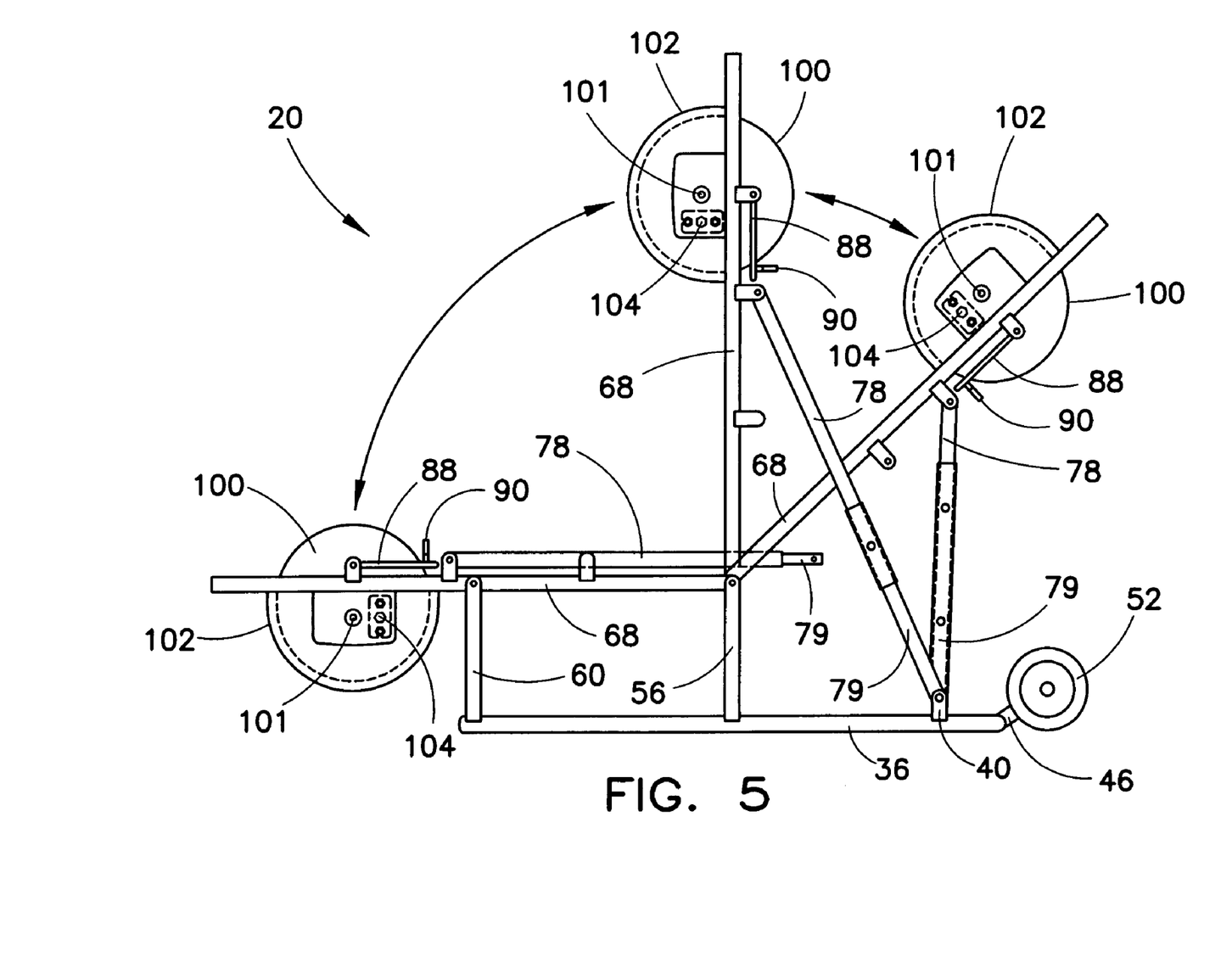
FIG. 5 is a side view of the present wire pulling device illustrating its range of various positions.

Referring to FIGS. 1-8, and particularly FIG. 1, there is depicted an exemplary embodiment of a portable wire pulling device, generally designated 20, fashioned in accordance with the principles presented herein. The wire pulling device 20 is formed in general by a frame assembly or frame 22, a wheel assembly 24 attached to the frame assembly 22, a spool or reel assembly 26 attached to the frame assembly 22, a drive assembly 28 that is operatively coupled with the reel assembly 24 and a pivoting rope guide assembly 30. The wire pulling device 20 is shown in a folded, collapsed or stowed position. FIGS. 2 and 3 depict the wire pulling device 20 in other positions. Particularly, FIG. 2 depicts the wire pulling device 20 in an upright position, while FIG. 3 depicts the wire pulling device 20 in an angled position. FIG. 4 illustrates that the wire pulling device 20 is portable through use of its wheel assembly 24 particularly when in an angled position such as depicted in FIG. 3. FIG. 5 illustrates the range of positions of the wire pulling device 20.

The frame 22 is made of a suitable material such as a metal (e.g. aluminum or steel) that is strong and durable. Other suitable materials may be used if desired. Moreover, the frame 22 is preferably generally tubular, but may be otherwise if desired. The frame 22 is formed in part by a base 36 that is fashioned as an elongated U-shaped member and includes first and second connection and pivot posts 54 and 56 that extend essentially perpendicular from opposite legs of the base 36. The first and second connection and pivot posts 54 and 56 are situated generally intermediate the ends of the base 36 and may include lateral supports at the base thereof shown in the figures as triangular support plates. The first and second posts 54, 56 terminate in connection and pivot structures or flanges 70 and 72 respectively that define connection points and pivots or pivot points.

The frame 22 also includes first and second support posts 58 and 60 that extend essentially perpendicular from opposite legs of the base 36. The first and second support posts 58 and 60 are situated generally at an end of the base 36 and particularly at the open end of the legs of the U-shaped base 36. A cross bar 59 is connected to and situated between the support posts 58, 60. It should be appreciated that the nomenclature first and second is arbitrary both here and throughout unless indicated otherwise.

The base 36 includes a first connection and pivot structure or flange 38 on one leg thereof and a second connection and pivot structure or flange 40 on another leg thereof. The structures 38, 40 each define a connection point and a pivot or pivot point. As described more fully below, each structure 38, 40 receives a leg 75, 79 of adjustable legs 71, 73 such that the respective leg 75, 79 is pivotally connected to the base 36. The adjustable legs 71, 73 allow the wire pulling device 20 to assume various positions. Additionally, the base 36 may include stabilization or mounting flanges 62 and 64.

The frame 22 is further formed in part by a spool frame 68 that, like the base 36, is formed as an elongated U-shaped member. The legs of the spool frame 68 are pivotally coupled to the connection and pivot structures 70 and 72 such that the spool frame 68 pivots about the posts 54, 56. This is depicted in some of the figures. The U-shaped end of the spool frame 68 serves as a handle when the present wire pulling device 20 is being moved such as shown in FIG. 4. The spool frame 68 has first and second flanges 82 and 84 that serve as stowing aids for the adjustable legs 71 and 73 (see e.g. FIG. 1).

The spool frame 68 further includes first and second connection and pivot structure or flanges 76 and 80. The structures 76, 80 each define a connection point and a pivot or pivot point 77 and 81 respectively. Each structure 76, 80 receives a leg 74, 78 of the adjustable legs 71, 73 such that the respective leg 74, 78 is pivotally connected to the spool frame 68. The legs 74 and 75 are adjustably coupled to one another to form the adjustable leg 71. The adjustable leg 71 is able to provide an adjustable-length support for one side of the spool frame 68. The legs 78 and 79 are adjustably coupled to one another to form the adjustable leg 73. The adjustable leg 73 is able to provide an adjustable-length support for the other side of the spool frame 68. The adjustable legs 71, 73 allow the wire pulling device 20 to assume various positions as depicted in the figures.

The spool frame 68 thus pivots or swings about its support legs. As such, the base 36 is sized to support this swinging without falling over, twisting or the like. And, since the spool/reel assembly 26 and the drive assembly 28 are supported by the spool frame 68, the spool/reel assembly 26 and the drive assembly 28 swing or pivot about the support legs for optimal positioning of the spool/reel assembly 26 and the drive assembly 28 for wire pulling.

The adjustable leg 71, formed by the two legs 74 and 75, is adjustable in length because the two legs 74 and 75 are coupled in a telescoping manner. As shown, the leg 74 forms an outer sleeve while the leg 75 forms an inner sleeve. Likewise, the adjustable leg 73, formed by the two legs 78 and 79, is adjustable in length because the two legs 78 and 79 are coupled in a telescoping manner. As shown, the leg 78 forms an outer sleeve while the leg 79 forms an inner sleeve. As depicted in FIG. 2, holes 83 are provided in the leg 78, while a spring button 85 in the leg 79 is configured to bias into a hole 83 when the spring button 85 aligns with a hole 83 as the legs are slid axially relative to one another. While not shown, the legs 74, 75 are adjustable in like manner. The adjustable legs 71 and 73 may be constructed for adjustability in other manners.

The adjustable legs 71, 73 allow the wire pulling device 20 to assume two (2) operating or non-stowed positions. FIG. 1 shows the wire pulling device 20 in a stowed position wherein the reel frame 68 and thus the reel assembly 26 rests on the supports of the base 36. FIG. 2 shows the wire pulling device 20 in an upright position wherein the reel frame 68 is essentially perpendicular to the base 36. FIG. 3 shows the wire pulling device 20 in an angled position wherein the reel frame is at an angle relative to the base 36. While this may be any angle, the shown angle of about 45° is considered optimal. This angle is good for pulling wire (see FIG. 3) and for moving (see FIG. 4). The wire pulling device 20 may be configured to be oriented in different positions.

The wheel assembly 24 of the wire pulling device includes an axle 48 and first and second wheels 50 and 52. The wheels 50, 52 are rotatably mounted on the axle 48. The axle 48 is supported by wheel flanges 44 and 46 that extend angularly from sides of the base 36 proximate the U-shaped end of the base 36.

The rope guide assembly 30 is pivotally connected to the reel frame 68. The reel frame 68 includes a flange 92 defining a connection/pivot point 93 on one leg of the reel frame 68 proximate the reel assembly 26. While not seen in the figures, the reel frame 68 includes a flange defining a connection/pivot point on the other leg of the reel frame 68 proximate the reel assembly 26. A U-shaped arm 88 has its legs pivotally coupled to/at the rope guide assembly connection/pivot points. An eyelet 90 is attached to the arm 88. As depicted in several of the figures (see e.g. FIGS. 2 and 3) a line or rope 110 feeds through the eyelet 90 from the spool or reel 100. The rope guide assembly 30 pivots or swings up and down along with the line 110 as represented by the double-headed arched arrow of FIG. 2.

Figure 6:
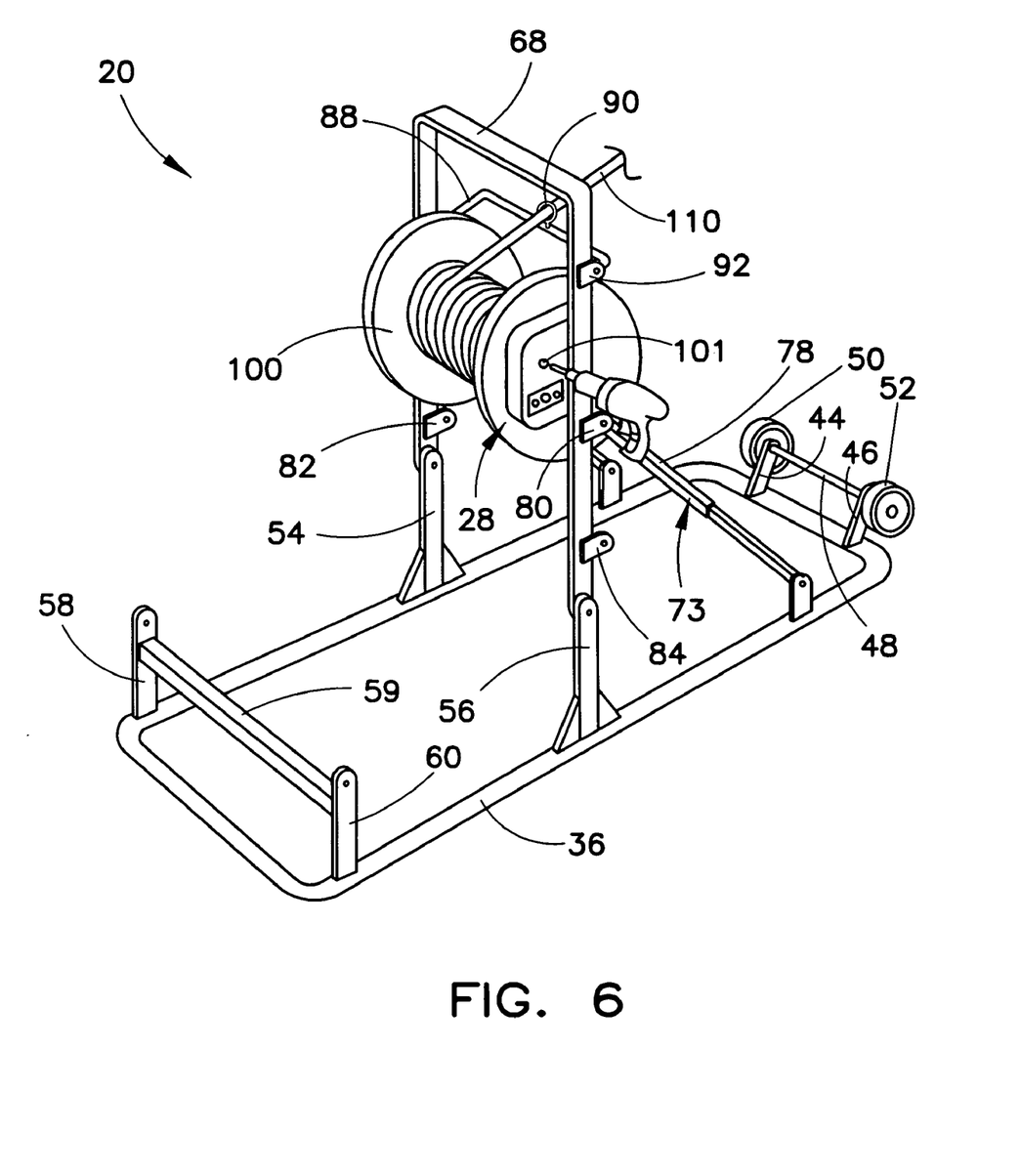
FIG. 6 is a perspective view of the wire pulling device of FIG. 1 illustrating the manner of using a cordless hand drill as motive power to operate the present wire pulling device in accordance with the principles of the present invention.

The drive assembly or hub 28 is attached at some portion thereof to the reel frame 68 and operatively coupled to the reel assembly 26 for receiving input rotational power and control functions such as starting, stopping, rotational direction, rotational speed and clutching from a full-function and/or clutching, cordless, battery-operated hand drill and transferring and/or coupling the rotational power and control functions to the reel 100 for driving, clutching and/or braking the reel 100 in order to wind the line thereon. The drive assembly 28 includes an input shaft 104 for receiving (releasable attachment) a portable cordless hand drill (see, e.g., portable cordless hand drill 500 in FIG. 6) or other battery driven rotational power source and control function device. The input shaft 104 is supported at one end by a front plate 120 that is mounted to the reel frame 68 (see FIG. 8) and at another end by a rear plate 128, the front and rear plates 120,128 held together via bolts 122 and 124. The input shaft 104 is particularly supported in a bushing 126 in the front plate 120 and a bushing 130 in the back plate 128. Moreover, the input shaft is configured as a hex head for easy receipt in the chuck of the portable cordless hand drill 500. Other configurations may be used.

Figure 7:
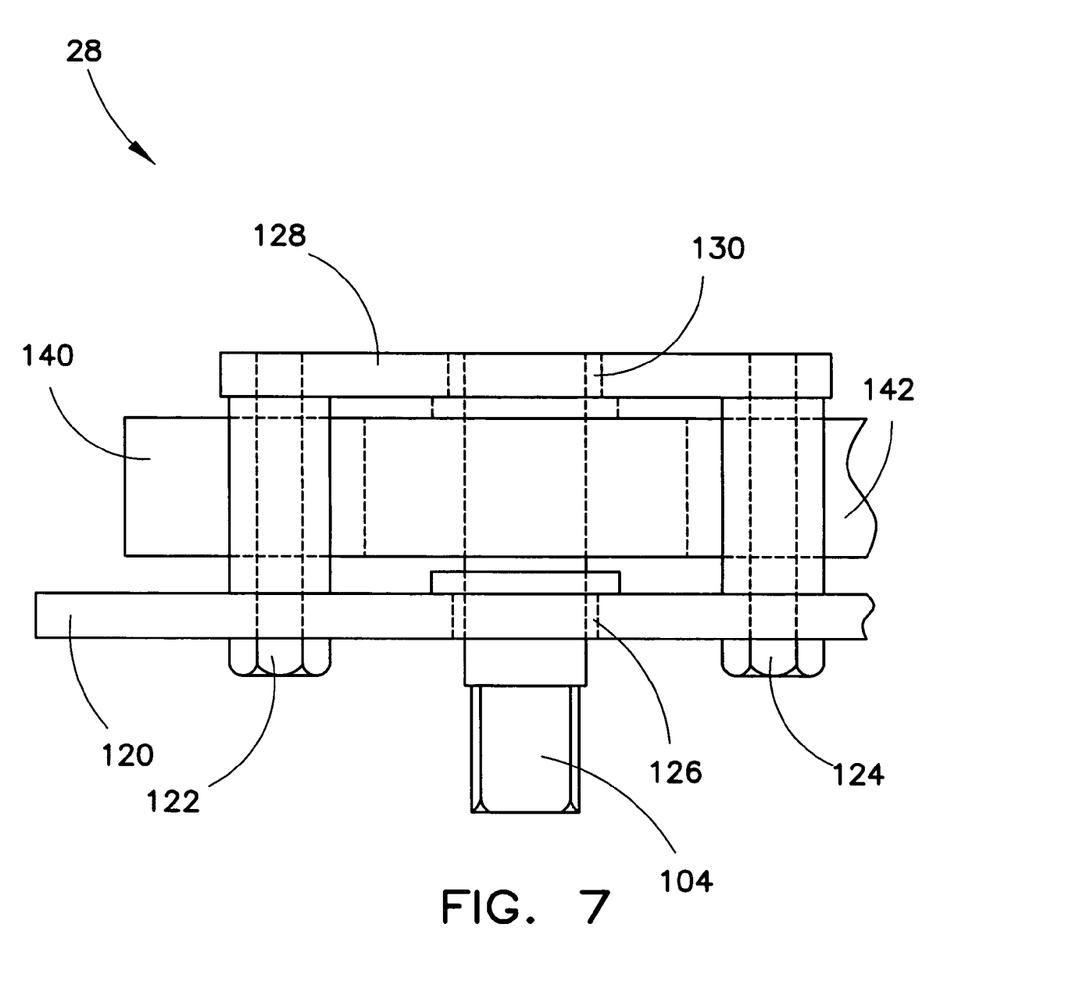
FIG. 7 is an enlarged partial top plan view of the drive mechanism of the present wire pulling device.
Figure 8:
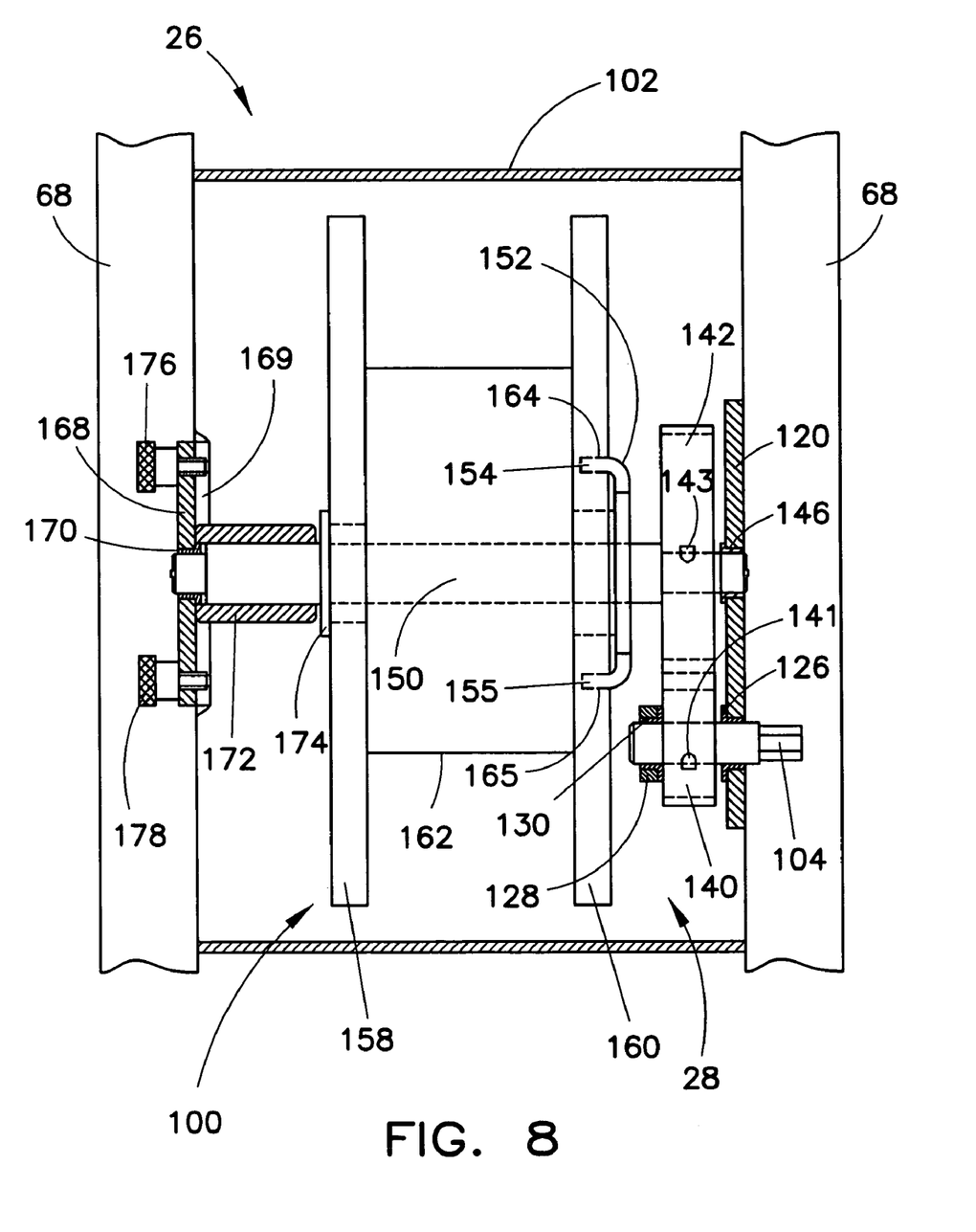
FIG. 8 is an enlarged sectional view of the reel assembly and drive mechanism of the present wire pulling device.

As best seen in FIGS. 7 and 8 the drive assembly 28 includes the input drive shaft 104 that is coupled to a first gear 140 by a key 141. A second, larger gear 142 is provided that meshes with the first gear 140. The second gear 142 is keyed 143 to the reel drive axle 150 such that rotation of the second gear 142 rotates the reel drive shaft 150 to rotate the reel 100 (through a shaft-to-reel engagement arrangement). More gearing, different gearing and/or no gearing may be provided, however, the present exemplary arrangement provides and illustrates a drive assembly 28 for transferring rotational power from the battery-operated cordless hand drill 500 to the reel 100 and supplying enough torque to pull appropriately sized wire, cable or the like as well as utilize the control features of the hand drill 500 to start, stop, control rotation direction and speed and clutching. It is preferable that the gearing allow for adequate transfer of rotational power and control. In the present exemplary embodiment, the first gear 140 has eighteen (18) teeth while the second gear 142 has forty-eight (48) teeth. This provides a roughly 1 to 2.67 (2 2/3) ratio. This allows a high rotation speed for the reel to pull various gauge wire. The reel drive axle 150 is rotatably supported at one end in a bushing 146 in the plate 120 and on another end by a bushing 170 in an end support plate 168.

As seen from the right side in FIG. 8, the reel drive axle 150 extends axially from the bushing 146 in the plate 120, through a reel engagement device 151, through the reel 100, through a bushing 174, through a collar or spacer 172 and through the bushing 170 in the end support plate 168. The reel engagement device 151 is attached to the drive shaft axle 150 and cooperates (releasably engages) with slots in an end of the reel 100 to form the shaft-to-reel engagement arrangement. Particularly, the reel engagement device 151 is a collar with a fork 152. The fork 152 includes prongs (two of which are shown) 154, 155 that extend into slots 164, 165 respectively in the end of the reel 100. This shaft-to-reel engagement allows the reel 100 to rotate/be driven by with the reel drive axle 150.

The reel drive axle 150 extends through the bushing 174 that is retained within the collar or spacer 172. The collar 172, bushing 174 and the reel drive axle 150 extend through an end mounting plate 169 that is attached to the reel frame 68. The reel drive axle 150 extends through the bushing 170 that is retained in the end support plate 168. The end support plate 168 is removably attached to the end mounting plate 169 via knurl-head screws 176, 178 or the like. The end support plate 168 also retains the collar 172 against the reel 100. Removal of the end support plate 169 through removal of the screws 176, 178 allows removal of the reel 100 and reel drive axle 150. FIG. 8 also shows an optional reel housing or cover 102 that may be attached to the reel frame 68 via a hinge arrangement or the like. The cover 102 extends about the reel 100 between the legs of the reel frame 68.

The present portable wire pulling device 20 operates in the following exemplary manner. The portable wire pulling device 20 is first moved to an appropriate location. A rope 110 or line such as from a "bucket of rope" (such as is known in the art) is extended about the desired wire run. The free end of the rope 110 extending through the line guide (if provided) is wound slightly around the reel 100. The other end of the rope at the "bucket" end is severed from the remaining bucket rope and tied securely to the wire, cable, bundle or the like as specified to be pulled.

The hand drill 500 is then attached to the input drive shaft 104 (drive assembly or hub). The hand drill is powered on for applying rotational power to the drive assembly and thus the reel as well as other control functions. Reel rotation winds the rope onto the reel and at the same time pulls the wire, cable, bundle or the like through the long wire run efficiently and very quickly by only one person operating the portable electric hand drill. After the wire bundle is pulled, it is detached from the rope that is now wound onto the reel. Any remaining length of rope is wound onto the reel. The reel is now ready to receive more rope if it is not full. The various features and/or functions of the hand drill such as enumerated above are used to provide control to and for the reel and particularly the wire pulling device.

The reel 100 may be specifically designed to fit into the present wire pulling device 20. Thus, when a new reel is needed, only a reel as designed herein to be received and used by the present wire pulling device 20 can be used. When a reel 100 is full of rope, it is removed from the frame 22 and discarded. Another reel 100 is then put into the frame. A reel can typically hold up to 4000' of rope.

The present portable wire pulling device can pull a variety of gauges of wire, sizes of cable, sizes of bundles of wire(s) and/or cable(s) and/or the like. For instance, the present portable wiring pulling device easily pulls six (6) gauge or smaller wire over a five hundred foot (500') run in two and one-half (2½) minutes. Also, 80% of a panel can easily be pulled by the present portable wire pulling device. All of this is accomplished with no on-site power. It should also be appreciated that a corded drill may be used by the present wire pulling device if desired.

The present invention provides a high speed wire pulling device that can easily pull 6 gauge and smaller wire quickly and efficiently. The present invention also provides control of the wire pulling device via a cordless hand held drill.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A portable wire pulling device comprising:
   a portable frame having an enlongated U-shaped base frame and an elongated U-shaped top frame that is pivotally connected to the base frame;
   a reel coupled to a reel drive shaft that is rotatably carried on the top frame; and
   a drive assembly coupled to the reel drive shaft and having an input drive shaft configured to be received by a battery-operated hand drill, and gearing coupling the input drive shaft to the reel drive shaft;
   the gearing configured to receive control functions and rotational power from a battery-operated hand drill and translate the control functions and rotational input power from the battery-operated hand drill to the reel drive shaft to operate the reel.

2. The portable wire pulling device of claim 1, wherein the reel drive shaft is removably attached to the top frame.

3. The portable wire pulling device of claim 2, wherein the reel drive shaft includes a reel engagement device that is configured to releasably engage the reel during operation.

4. The portable wire pulling device of claim 1, further comprising a line guide.

5. The portable wire pulling device of claim 4, wherein the line guide is pivotally connected to the top frame.

6. The portable wire pulling device of claim 1, further comprising a wheel assembly connected to the base frame and configured to support the portable frame for moving the portable frame via wheels of the wheel assembly.

7. The portable wire pulling device of claim 1, wherein the top frame is configured for adjustable positioning relative to the base frame.

8. The portable wire pulling device of claim 7, wherein the portable frame further comprises a pair of adjustable legs each one pivotally connected at one end to the top frame and at another end to the base frame.

9. The portable wire pulling device of claim 8, wherein each adjustable leg is configured as a telescoping leg.

10. The portable wire pulling device of claim 9, wherein the top frame is positionable into an upright position and an angled position.

11. A portable wire pulling device comprising:
  a reel configured to carry a line of sufficient length to reach across a distance;
  a folding frame defined by an elongated U-shaped top frame pivotally connected to an elongated U-shaped base frame, the top frame configured to rotatably carry the reel; and
  a drive interface coupled to the reel and configured to couple to, receive and transfer rotational power and control features from a rechargeable, battery-operated portable hand drill to the reel to provide power to rotate the reel and control functions to control the reel.

12. The portable wire pulling device of claim 11, wherein the top frame is configured for adjustable positioning relative to a the base frame.

13. The portable wire pulling device of claim 12, wherein the folding frame further comprises a pair of adjustable legs each one pivotally connected at one end to the top frame and at another end to the base frame.

14. The portable wire pulling device of claim 13, wherein each adjustable leg is configured as a telescoping leg.

15. The portable wire pulling device of claim 14, wherein the top frame is positionable into an upright position, an angled position and a stowed position relative to the base frame.

16. A portable wire pulling device comprising:
  a portable frame having a base frame and a top frame that is pivotally connected to the base frame, the base frame and the top frame both formed as elongated U-shaped members;
  a reel coupled to a reel drive shaft that Is rotatably carried on the top frame; and
  a drive assembly coupled to the reel drive shaft and having an input drive shaft configured to be received by a battery-operated hand drill, and gearing coupling the Input drive shaft to the reel drive shaft, the gearing configured to receive control functions and rotational power from a battery-operated hand drill, translate the control functions and rotational input power from the battery-operated hand drill to the reel drive shaft to operate the reel, and provide a gear ratio of input drive shaft to reel drive shaft of 1 to 2.67.

17. The portable wire pulling device of claim 16, wherein the reel drive shaft is removably attached to the top frame.

18. The portable wire pulling device of claim 17, further wherein the reel drive shaft includes a reel engagement device that is configured to releasably engage the reel during operation.

19. The portable wire pulling device of claim 16, further comprising a line guide that is pivotally connected to the top frame.

20. The portable wire pulling device of claim 16, wherein the top frame is configured for adjustable positioning relative to the base frame.

* * * * *